(12) United States Patent
Rexberg et al.

(10) Patent No.: US 9,362,973 B2
(45) Date of Patent: Jun. 7, 2016

(54) RADIO MODULE, RADIO ASSEMBLY AND CORRESPONDING METHOD

(75) Inventors: Leonard Rexberg, Hässelby (SE); Bernt Johansson, Värmdö (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/009,369

(22) PCT Filed: Apr. 11, 2011

(86) PCT No.: PCT/SE2011/050436
§ 371 (c)(1),
(2), (4) Date: Oct. 2, 2013

(87) PCT Pub. No.: WO2012/141624
PCT Pub. Date: Oct. 18, 2012

(65) Prior Publication Data
US 2014/0016682 A1    Jan. 16, 2014

(51) Int. Cl.
*H04B 1/38* (2015.01)
*H04B 1/40* (2015.01)
*H04B 7/04* (2006.01)
*H01Q 3/26* (2006.01)
(Continued)

(52) U.S. Cl.
CPC .. *H04B 1/40* (2013.01); *H01Q 3/26* (2013.01); *H01Q 3/267* (2013.01); *H04B 7/0413* (2013.01); *H04B 17/12* (2015.01); *H04W 88/06* (2013.01)

(58) Field of Classification Search
USPC .......................................... 375/219
See application file for complete search history.

(56) References Cited

U.S. PATENT DOCUMENTS

| 5,912,927 A | 6/1999 | Smith et al. |
| 6,993,001 B1 | 1/2006 | Polan et al. |

(Continued)

FOREIGN PATENT DOCUMENTS

| EP | 1320146 A1 | 6/2003 |
| EP | 1713290 A1 * | 10/2006 |

(Continued)

OTHER PUBLICATIONS

International Search Report, PCT/SE2011/050436, Jan. 10, 2012.
Written Opinion of the International Searching Authority, PCT/SE2011/050436, Jan. 10, 2012.

(Continued)

*Primary Examiner* — Dac Ha
*Assistant Examiner* — Janice Tieu
(74) *Attorney, Agent, or Firm* — Patents on Demand, P.A.; Brian K. Buchheit; Scott M. Garrett (57) ABSTRACT

A radio module is disclosed that includes a baseband device, a layer device, and a multi radio antenna. The baseband device is arranged to perform digital modulation and/or demodulation. The baseband device provides a data connection available to a digital system using the radio module for radio communication. The multi radio antenna includes an analog radio device arranged to perform analog signal processing, and an antenna array connected to the analog radio device. The layer device is arranged to map each baseband device to one or more of the at least one multi radio antennas, and the radio module is connectable to a second equivalent radio module. A corresponding radio assembly and method are also disclosed.

17 Claims, 5 Drawing Sheets

(51) Int. Cl.
*H04W 88/06* (2009.01)
*H04B 17/12* (2015.01)

(56) References Cited

U.S. PATENT DOCUMENTS

| | | | |
|---|---|---|---|
| 2005/0245199 A1* | 11/2005 | Batra et al. | 455/73 |
| 2008/0139156 A1* | 6/2008 | Behzad et al. | 455/296 |
| 2008/0261642 A1 | 10/2008 | Tang et al. | |
| 2009/0010316 A1 | 1/2009 | Rofougaran | |
| 2009/0282310 A1* | 11/2009 | Seok et al. | 714/748 |
| 2010/0172424 A1* | 7/2010 | Perets et al. | 375/260 |

FOREIGN PATENT DOCUMENTS

| | | |
|---|---|---|
| EP | 2299774 A1 * | 3/2011 |
| WO | WO 2009/066200 | 5/2009 |
| WO | WO 2009/114738 A2 | 9/2009 |

OTHER PUBLICATIONS

Liberti, J. C., Jr. et al. (1995). Introduction to Smart Antennas: Spatial Processing for Wireless Systems. In *Smart antennas for wireless communications*, Chapt. 3, Section 3.11 *Transmission Beamforming* (pp. 111-114). Prentice-Hall.

Supplementary European Search Report, App. No. 11863465.8-1855, dated Oct. 17, 2014, 8 pages.

* cited by examiner

RADIO MODULE, RADIO ASSEMBLY AND CORRESPONDING METHOD

CROSS REFERENCE TO RELATED APPLICATION

This application is a 35 U.S.C, §371 national stage application of PCT International Application No. PCT/SE2011/050436, filed on 11 Apr. 2011, the disclosure and content of which is incorporated by reference herein in its entirety. The above-referenced PCT International Application was published in the English language as International Publication No. WO 2012/141624 A1 on 18 Oct. 2012.

TECHNICAL FIELD

The present invention relates to a radio module, radio assembly and corresponding method.

BACKGROUND

As high bitrate communication and large data volume increases in popularity, the strive for delivering and designing corresponding delivery systems is intensified. At the same time, the available bandwidth spectrum is becoming progressively smaller. As bandwidth is a proportional factor in defining data capacity, it is evident that all techniques aiming at enhancing bandwidth efficiency are of high importance. The industry has since the beginning of cellular communication developed and pushed for new spectrum efficient communication standards going from the very first generation analog systems such as the AMPS (Advanced Mobile Phone System), TACS (Total Access Communication System) and NMT (Nordic Mobile Telephone) through digital systems such as D-AMPS (Digital AMPS) and GSM (Global System for Mobile communications) defining second generation systems, to the third generation systems like CDMA (Code Division Multiple Access) and W-CDMA (Wideband CDMA) as well as fourth generation systems such as LTE (Long Term Evolution).

For example, LTE Advanced as it is being defined, is one of the standards that calls for even higher bitrates. Together with high bitrates, aggregation of frequency bands, where available, is also a new theme not yet proposed in other standards. To be able to keep up with the spectrum efficiency at the same time, this calls for a new way of building practice with distributed active antenna elements. Other names of this approach are for example active antennas (AA), integrated antennas (IA), or Intelligent Active Antennas (IAA).

Implementing such active antennas is a complex task that requires careful design and assembly. It would be of great benefit if building and deploying active antennas were to be simplified and reduced in complexity.

U.S. Pat. No. 5,912,927 presents a multi-channel transceiver with an adaptive antenna array. The presented system utilizes digital signal combining and splitting to reduce losses and signal degradation. However, the presented solution is a mere splitting/combining of signals and does not provide any significant advantage to active antennas.

SUMMARY

It is an object to reduce complexity and increase efficiency when building and deploying active antennas.

According to a first embodiment, it is presented a radio module comprising: a baseband device arranged to perform digital modulation and/or demodulation, wherein the baseband device provides a data connection available to a digital system using the radio module for radio communication; a layer device; and at least one multi radio antenna. The multi radio antenna comprises: an analogue radio device arranged to perform analogue signal processing; and an antenna array connected to the analogue radio device. The layer device is arranged to map each baseband device to one or more of the at least one multi radio antennas, and the radio module is connectable to a second equivalent radio module.

Such a radio module can be used to significantly reduce the complexity of assembling active antennas. In particular, several equivalent radio modules can be combined to achieve a desired configuration. Moreover, the flexibility achieved using such modules allows for increase or reduction of capacity with great ease compared to the prior art.

Each one of the at least one multi radio antenna may further comprise a digital radio device arranged to perform digital signal processing, the digital radio device being connected to the baseband device and the analogue radio device.

The baseband device may be connectable to an equivalent baseband device of the second equivalent radio module. In other words, equivalent radio modules can be connected using each other's baseband devices.

The baseband device may be configurable to be in one of two modes of a controlling master mode and controlled slave mode, for cooperation with the second equivalent radio module. This allows the radio module with a baseband device being in master mode to control a radio module with a baseband device being in slave mode. Physically, two connected radio modules can thus be of the same type, with the only difference being the configuration of the base device to be in master mode or slave mode. Moreover, using this control strategy, no central control unit is required, simplifying adding or removing radio modules.

Each one of the at least one multi radio antenna may be connectable to an equivalent multi radio antenna of the second radio module. In other words, equivalent radio modules can be connected using each other's multi radio antenna devices.

The digital radio device may be configurable to be in one of two modes of a controlling master mode and controlled slave mode, for cooperation with the second equivalent radio module. This allows the radio module with a digital radio device being in master mode to control a radio module with a digital radio device being in slave mode. Physically, two connected radio modules can thus be the same, with the only difference being the configuration of the digital radio device to be in master mode or slave mode.

The digital radio device may be arranged to perform at least one of the tasks of complex phase rotation, digital pre-distortion, crest factor reduction, channelizing and combining.

The analogue radio device may be arranged to perform at least one of the tasks of amplification and filtering.

The radio module may further comprise a calibration device which is connected to the digital radio device, the analogue radio device and the antenna array.

The radio module may further comprise an antenna selector connected to the digital radio device. This allows an arbitrary connection of a radio branch of the radio module to any one or more antenna elements of the antenna array. Optionally, the digital radio device provides several radio branches, where the connection of each radio branch to one or more antenna elements of the antenna array is effected using the antenna selector.

A second embodiment is a radio assembly comprising a plurality of radio modules according to the first embodiment.

A third embodiment is a method for controlling radio usage in a master radio module and a slave radio module, wherein the master radio module and the slave radio module respectively comprise a baseband device arranged to perform digital modulation and/or demodulation; a layer device; and at least one multi radio antenna comprising: an analogue radio device arranged to perform analogue signal processing; and an antenna array connected to the analogue radio device. The baseband device of the master radio module thus provides a data connection available to a digital system using the master radio module and the slave radio module for radio communication wherein the layer device is arranged to map each baseband device to one or more of the at least one multi radio antennas. The method comprises: in the master radio module, controlling the slave radio module.

It is to be noted that any feature of the first, second and third embodiments may, where appropriate, be applied to any other of these embodiments.

Generally, all terms used in the application are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
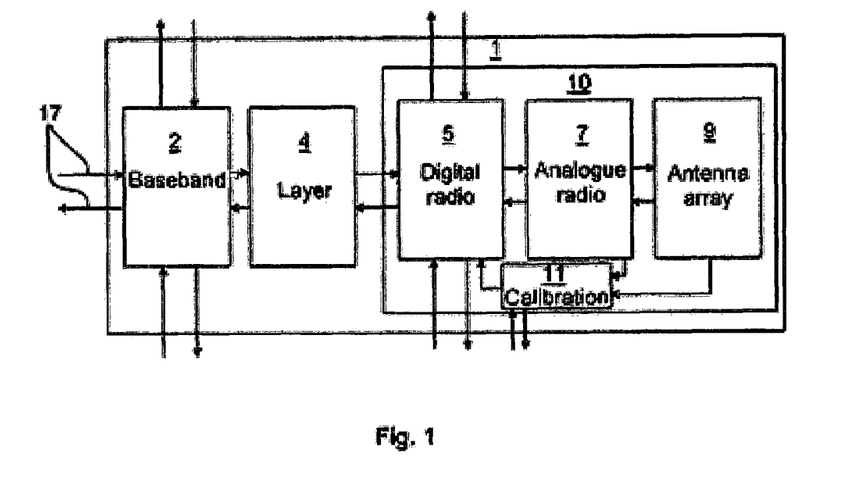
FIG. 1 is a schematic diagram showing components of a radio module according to one embodiment.

FIG. 1 is a schematic diagram showing components of a radio module 1 according to an embodiment. Several such radio modules 1 can be connected to each other to form a radio assembly, as shown in FIGS. 3A-B and FIGS. 4A-4C below. The radio module 1 comprises a baseband device 2 and an MRA (Multi Radio Antenna) 10 comprising a digital radio device 5, an analogue radio device 7, an antenna array 9 and an optional calibration device 11. The MRA can be a self contained device which simplifies assembly of a desired antenna structure.

In one embodiment, the MRA 10 can have both a receiver chain and a transmitter chain in one MRA. Alternatively, there are separate MRAs for the receiver chain and the transmitter chain.

The baseband device 2 is arranged to perform digital modulation and/or demodulation for transmission and reception, respectively. In this way, the baseband device provides a data connection 17 available to a digital system using the radio module for radio communication to receive and/or transmit data.

A layer device 4 maps each baseband device 2 to one or more MRAs 10. This mapping can be effected in an interconnect module, which can be part of the digital radio device 5, as shown in FIG. 1, or external to the digital radio device 5. The layer device 4 can, for example, implement MIMO coding using a codebook. In such an embodiment, each MRA 10 provides its own MIMO channel. The baseband device 2 supports modulation signal processing for any standard applicable for the radio module 1. Furthermore, bandwidth independency and carrier frequency independency is supported. That is, frequency aggregation can in some cases be supported by a single baseband device 2 handling a multitude of standards such as LTE, W-CDMA, etc. Codebook based MIMO is supported by multi-branch antenna excitation. In the case of LTE standard, the codebook entry is applied before the iFFT (inverse Fast Fourier Transform) block to the baseband.

The baseband device 2 may be constructed by hard-coded instructions in the form of one or several ASICs (Application-Specific Integrated Circuits) and by additional DSP (Digital Signal Processor) kernels to accelerate certain common signal processing features. It would also be possible to implement the baseband by the use of more flexible FPGAs (Field-Programmable Gate arrays) that can be reprogrammed in the field.

The digital radio device 5 performs a set of digital signal operations that may be processed in a common manner by a single digital radio device 5.

In the transmit chain, the digital radio device 5 may for example perform complex phase rotation on a carrier basis, digital pre-distortion (DPD), crest factor reduction (CFR), channelizing and combining. The transmit chain (and/or receive chain) can comprise a plurality of radio branches, where each radio branch supports one antenna element. Each such radio branch may have its own dedicated CFR and linearization on a carrier combined signal and standard combined signal, but performed in a common way. The phase rotation enables remote electrical tilt (RET) on a carrier basis or standard basis. The phase rotation could even be performed on a per user basis, e.g. by performing this before the iFFT-block. In such an embodiment, the iFFT-block would be distributed on each antenna branch. The digital radio device 5 may also comprise a general unit for equalization and compensation over frequency for phase and amplitude imbalances between radio branches.

In the receive chain, the digital radio device 5 can comprise a set of units corresponding to the units of the digital radio device in the transmit chain. Optionally, the receive chain also comprises other units such as a general Maximum Ratio Combiner (MRC) or similar for uplink adaptive algorithms. Instead of crest factor reduction, as in the transmit chain, channel filtering may be used.

The defined radio branches may be combined to interact with an antenna array 9 of n antenna elements, so that several antenna elements of the antenna array 9 can be used in order to increase antenna gain and power output for the transmit chain. This can be used in both the receive chain and in the transmit chain.

The digital radio device may be constructed in several ways depending on desired level of integration and product level. ASICs may be used when the technology is mature enough to be hard-coded, whereas an FPGA may be used in a stage where there is more development. CPUs (Central Processing Units) can be used for control oriented tasks that do not require fast signal processing.

The analogue radio device 7 comprises analogue circuits for amplification and filtering on a per antenna element basis. It also comprises means to supply de-coupled RF signals to the calibration device 11, to be processed in a comparative manner so as to gain information about relative phase and amplitude between radio branches of the transmit chain and between radio branches of the receive chain, respectively. The digital radio device 5 is used to apply corrections for possible imbalances in the different radio branches, at baseband frequency.

A feature of the MRA 10 is to support a distributed amplification and filtering to each antenna element of the antenna array 9. It is to be noted that each antenna element may in itself comprise one antenna or a plurality of statically configured (but reconfigurable) antennas, effectively forming a sub-array.

Using embodiments herein, multi-dimensional antenna arrays are supported. The analogue radio device 7 as well as much of the functional digital signal processing in the digital radio device 5 is directly mapped to each antenna element in this antenna array 9. In this way, the configuration implements an active antenna.

Figure 3A:
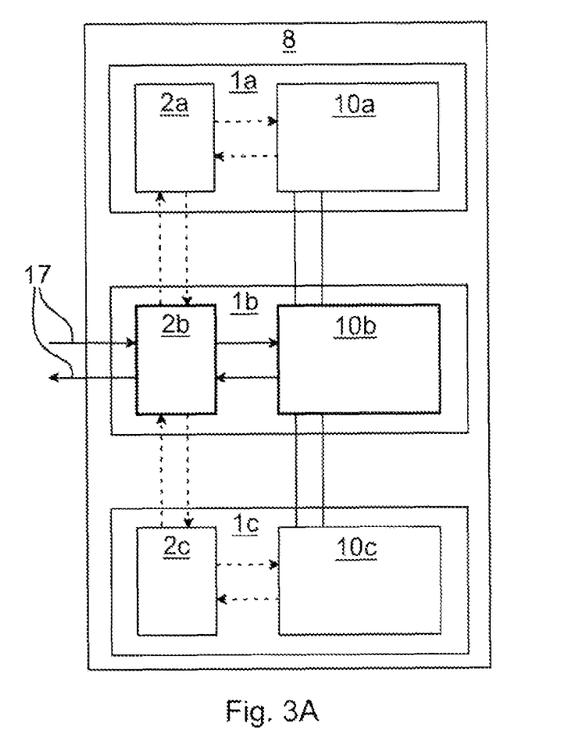
FIGS. 3A-3B are schematic diagrams showing an embodiment of several connected radio modules, according to FIGS. 1 and 2.
Figure 3B:
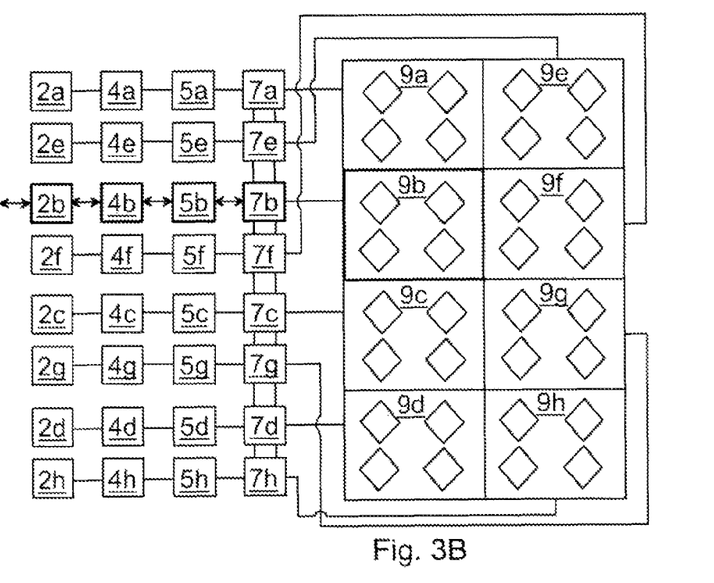

It is to be noted that this radio architecture supports not only a one-dimensional antenna array, but also a two dimensional antenna array as shown in FIG. 3B or even a three dimensional antenna array if so desired.

A two dimensional (2D) antenna array 9 comprises antenna elements not only distributed along one axis in a coordinate system (polar, Cartesian, etc.) but also has a distribution along a second axis. In a Cartesian system, this would correspond to for example, having antenna elements distributed in a rectangular grid extending in two dimensions. In a polar system on the other hand, this would mean having antenna elements aligned in a polar grid in some even distribution over radius and angle.

In a three dimensional (3D) antenna array 9, the antenna elements might be placed in a three dimensional lattice in order to fill up a certain volume as opposed to merely a two dimensional surface. Again, this lattice might be of Cartesian type, or of a spherical type or in fact any other coordinate system.

Multi dimensional (2D or 3D) antenna arrays 9 in this context means that MIMO is supported by use of at least one direction of independent stream selection, whereby the other direction might be used solely for achieving antenna gain or electrical antenna tilt. Alternatively or additionally, MIMO could be provided in a multi-dimensional manner. A 2D alignment is also to be understood as including e.g. the surface of a sphere.

The mapping may also be done indirectly by an analogue RF mux. A well known example of such a mux is the Butler matrix, but other RF matrices may also be used. By a such an arrangement, a static antenna arrangement may be reconfigurable by adjusting switch settings or by the controllable mux matrix.

MRAs can be stacked column wise or in a slave manner in order to increase gain in the antenna array thus formed. Antenna gain can be achieved by letting the same RF signal be transmitted by a multitude of antenna elements, and hence define a coherent system by which an antenna pattern may be defined. At the same time, the transmitted power will automatically also be increased in a proportional manner. Alternatively or additionally, MRA's may be combined in parallel in order to increase the antenna gain also in the horizontal direction in a slave configuration. If configured in a master-master configuration, additional MIMO streams may be supported, allowing multiple standards, e.g. LTE and W-CDMA, to be supported by the same antenna assembly. This configuration may be implemented either column-wise or row-wise by parallel arrangement.

By connecting calibration devices 11 between radio modules 1, calibration can be maintained in the whole active antenna implementation collectively.

Figure 2:
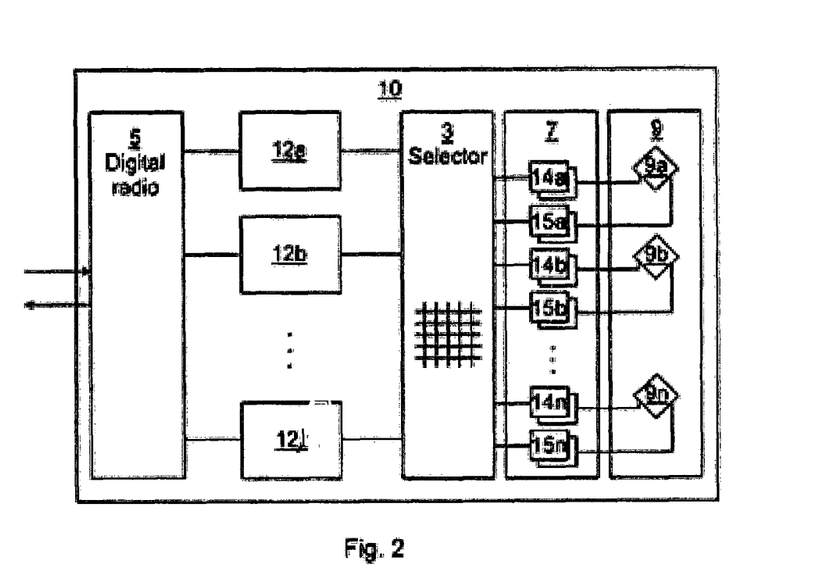
FIG. 2 is a schematic diagram showing components of a multi radio antenna of FIG. 1.

FIG. 2 is a schematic diagram showing components of an MRA 10 of a radio module of FIG. 1 in some more detail. The digital radio device 5 is connected to a plurality of columns 12a-1. Each column 12a-1 corresponds to one signal stream in a two dimensional structure. Each column is connected, using a selector 3, to a plurality of antenna elements of antenna arrays 9a-n, via filters 14a-n, 15a-n, corresponding to the analogue radio device 7. In this example, there are thus l signal streams supported by n antenna elements.

The structure of FIG. 3 can be used for receiving and/or transmitting radio signals.

FIGS. 3A-3B are schematic diagrams showing an embodiment of several connected radio modules 1 of FIGS. 1 and 2. The configuration shown in FIG. 1 is used for each of the radio modules 1a-1c of FIG. 3A, the only difference between radio modules 1a-1c being whether each radio module 1a-1c is configured to be a master or slave device. A first radio module 1a comprises a first baseband device 2a and a first MRA 10a. A second radio module 1b comprises a second baseband device 2b and a second MRA 10b. Analogously, a third radio module 1c comprises a third baseband device 2c and a third MRA 10c. The radio modules 1a-1c are installed as part of a fixed part of a mobile communication network for radio communication with mobile devices.

The three radio modules 1a-1c are connected to form a radio assembly 8. The radio modules 1a-1c work collectively to allow the radio assembly 8 to function as a multidimensional antenna array. Due to the modular and identical structure of each of the radio modules 1a-1c, production and construction of the radio assembly 8 is simple and cost effective. The only difference between the radio modules 1a-c is that the second radio module 1b is configured to be the master and the other two radio modules 1a, 1c are configured to be slaves. The second radio module 1b thus provides a data connection 17 available to a digital system to use the radio modules 1a-c for radio communication. Each one of the radio modules 1a-c can be used for receiving and/or transmitting radio signals.

FIG. 3B shows more graphically how radio modules may cooperate to create an antenna array. In the example embodiment shown in FIG. 3B, eight baseband devices 2a-h, eight digital radio devices 5a-h, eight analogue radio devices 7a-h and eight antenna arrays 9a-h are shown. In effect, even though the layout is slightly different in this diagram to illustrate the antenna element layout and therefore MRAs are not easily illustrated, eight MRAs are present, such that each MRA comprises one of the digital radio devices, one of the analogue radio devices and one of the antenna arrays. The layout of the digital radio devices 5a-h and analogue radio devices 7a-h may vary, but it is shown in FIG. 3B how the antenna arrays 9a-h can be arranged to form a desired physical layout of antenna elements.

While it is shown here in this example, that each antenna array 9a-h comprises four antenna elements arranged in a square pattern, any other suitable number of antenna elements and arrangement within each antenna array 9a-h is possible.

While it is shown here a set of eight radio modules arranged in a 4×2 pattern, the same principle can be applied to any suitable arrangement using a corresponding number of radio modules, supporting e.g. 2×2, 4×4, 8×8 radio modules.

Figure 4A:
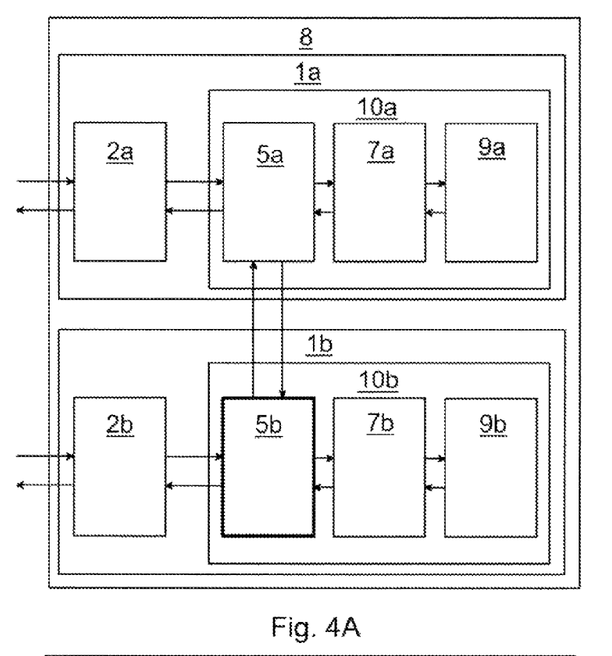
FIGS. 4A-4C are schematic diagrams showing different master and slave configurations of radio modules according to FIGS. 2 and 3.
Figure 4B:
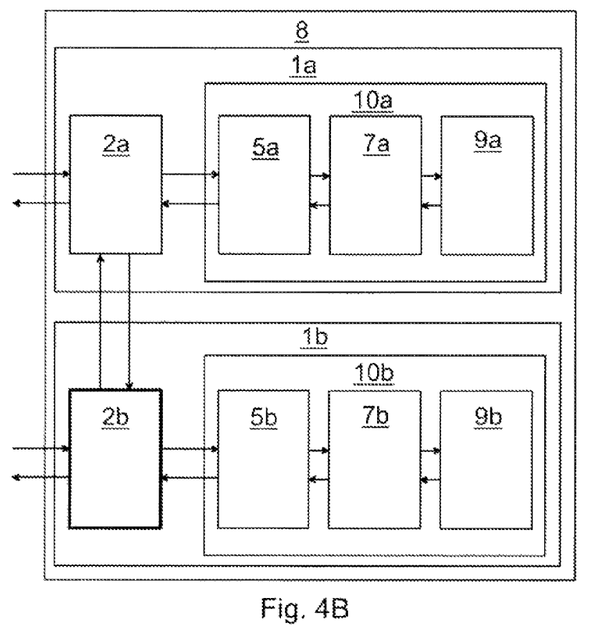
Figure 4C:
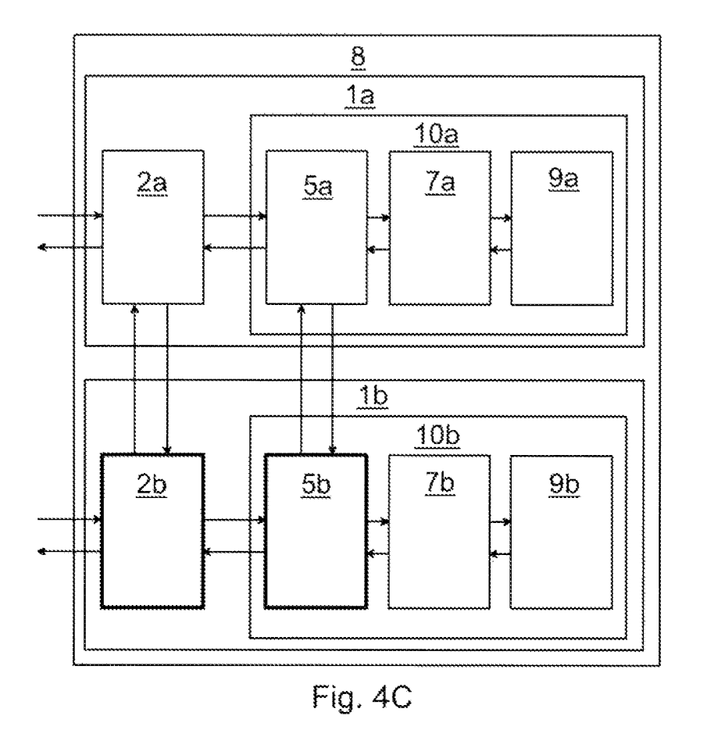

FIGS. 4A-4C are schematic diagrams showing different master and slave configurations of radio modules according to FIGS. 2 and 3.

In FIG. 4A, a radio assembly 8 comprises a first radio module 1a and a second radio module 1b. The two radio modules 1a-b have identical hardware structures, but the second radio module 1b, and, in particular a second digital radio device 5b of the second radio module 1b, is configured to be master, while the first radio module 1a, and in particular a first digital radio device 5a of the first radio module 1a, is configured to be slave. Each radio module 1a-b can be defined either as a master or slave radio module. At least one radio module in each radio assembly 8 is set to be a master. While two radio modules 1a, 1b are presented to be part of the radio assembly 8 here, the radio assembly 8 can comprise any suitable number of radio modules.

One or a number of radio module(s) can thus be combined into a specific active antenna implementation. In the configuration of FIG. 4A, the first baseband device 2a of the first radio module 1a is inactive, but still present.

An advantage of defining master/slave at the digital radio device stage is that, from a functional perspective, the antenna signal streams are already modulated and can be forwarded to the slave mode MRA. A certain pooling of baseband resources may therefore be utilized.

In FIG. 4B, a radio assembly 8 comprises the first radio module 1a and the second radio module 1b in a slightly different embodiments compared to what is shown in FIG. 4A. The two radio modules 1a-b have identical hardware structures, but the second radio module 1b, and in particular the second baseband device 2b of the second radio module 1b, is configured to be master, while the first radio module 1a, and in particular the first baseband device 2a of the first radio module 1a, is configured to be slave. As in the example of FIG. 4A, each radio module 1a-b can be defined either as a master or slave radio module. At least one radio module in each radio assembly 8 is set to be a master. While two radio modules 1a, 1b are presented to be part of the radio assembly 8 here, the radio assembly 8 can comprise any suitable number of radio modules.

An advantage of defining master/slave at the baseband stage is that a plurality of, for example, frequency bands, may be muxed into the same MRA. This means a certain pooling of MRA:s in contrast to defining master/slave at the digital radio device stage, as explained above.

FIG. 4C shows a combination of what is shown in FIGS. 4A and 4B. In the disclosed example, both baseband modules 2a, 2b are master modules, supporting multiple standards. Moreover the second digital radio device 5b of the second radio module 1b, is configured to be master, while the first digital radio device 5a of the first radio module 1a, is configured to be slave.

Figure 5:
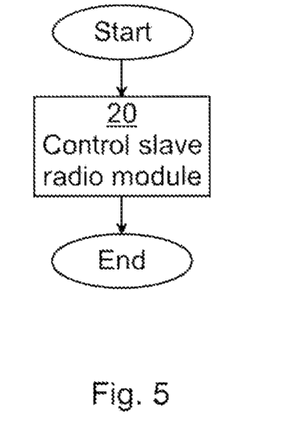
FIG. 5 is a flow chart illustrating a method according to an embodiment in accordance with FIGS. 4A-4C.

FIG. 5 is a flow chart illustrating a method according to an embodiment in accordance with FIGS. 4A-4B. The method is used to control radio usage in a master radio module and a slave radio module which are connected to each other in a radio assembly. The method comprises the step 20 of, in the master radio module, controlling the slave radio module.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A plurality of radio modules comprising:
   a first radio module comprising:
      a first baseband device arranged to perform digital modulation and/or demodulation, wherein the first baseband device provides a data connection available to a digital system using the first radio module for radio communication;
      a first layer device; and
      at least one first multi radio antenna comprising: a first analogue radio device arranged to perform analogue signal processing; and a first antenna array connected to the first analogue radio device;
   a second radio module comprising:
      a second baseband device, wherein the second baseband device is arranged to perform digital modulation and/or demodulation, wherein the second baseband device provides a second data connection available to the digital system using the second radio module for radio communication;
      a second layer device; and
      at least one second multi radio antenna comprising: a second analogue radio device arranged to perform analogue signal processing; and a second antenna array connected to the second analogue radio device,
   wherein the first radio module is connected to the second radio module including the second baseband device, and
   wherein the first layer device is arranged to map the first baseband device to one or more of the at least one first multi radio antennas.

2. The radio module according to claim 1, wherein each one of the at least one multi radio antenna further comprises:
   a digital radio device arranged to perform digital signal processing, the digital radio device being connected to the first baseband device and the first analogue radio device.

3. The radio module according to claim 2, wherein the digital radio device is configurable to operate in one of two modes of a controlling master mode and controlled slave mode, for operation with the second radio module.

4. The radio module according to claim 2, wherein the digital radio device is arranged to perform at least one of complex phase rotation, digital pre distortion, crest factor reduction, channelizing, or combining.

5. The radio module according to claim 2, further comprising a calibration device which is connected to the digital radio device, the first analogue radio device, and the first antenna array.

6. The radio module according to claim 2, further comprising an antenna selector connected to the digital radio device.

7. The radio module according to claim 1, wherein the first baseband device is connected to the second baseband device of the second radio module.

8. The radio module according to claim 1, wherein the first baseband device is configurable to operate in one of two modes of a controlling master mode and controlled slave mode, for operation with the second radio module.

9. The radio module according to claim 1, wherein each one of the at least one first multi radio antenna is connected to a second multi radio antenna of the second radio module.

10. The radio module according to claim 1, wherein the first analogue radio device is arranged to perform at least one of amplification or filtering.

11. The radio module according to claim 1, wherein the layer device maps signals from the first and second baseband devices based on MIMO coding using a codebook.

12. The radio module according to claim 11, wherein the MIMO coding using the codebook is performed in response to excitation of at least two of the multi radio antennas.

13. The radio module according to claim 12, wherein each multi radio antenna is associated with a separate MIMO channel.

14. A method for controlling radio usage in a master radio module and a slave radio module, wherein the master radio module and the slave radio module respectively comprise a baseband device, a layer device and at least one multi radio antenna comprising: an analogue radio device and an antenna array connected to the analogue radio device, the method comprising:

performing, by the baseband device of the master radio module and the slave radio module, digital modulation and/or demodulation;

performing, by the analogue radio device of the master radio module and the slave radio module, analogue signal processing;

providing, by the baseband device of the master radio module, a data connection available to a digital system using the master radio module and the slave radio module for radio communication;

mapping, by the layer device of the master radio module, signals from each baseband device of the master radio module to one or more of the at least one multi radio antennas; and controlling, by the master radio module, the slave radio module.

15. The radio module according to claim 14, wherein the mapping comprises mapping the signals from each baseband device of the master radio module and the slave radio module based on MIMO coding using a codebook.

16. The radio module according to claim 15, wherein the MIMO coding using the codebook is performed in response to excitation of at least two of the multi radio antennas of the master radio module and/or the slave radio module.

17. The radio module according to claim 16, wherein each multi radio antenna of the master radio module is associated with a separate MIMO channel.

\* \* \* \* \*